Dec. 23, 1969   J. F. ROODS ET AL   3,484,917
COMBINATION POWER TOOL

Filed May 9, 1967   2 Sheets-Sheet 1

INVENTORS.
John F. Roods
Jerome A. Buschman

By Robert W. Laliturn
Attorney

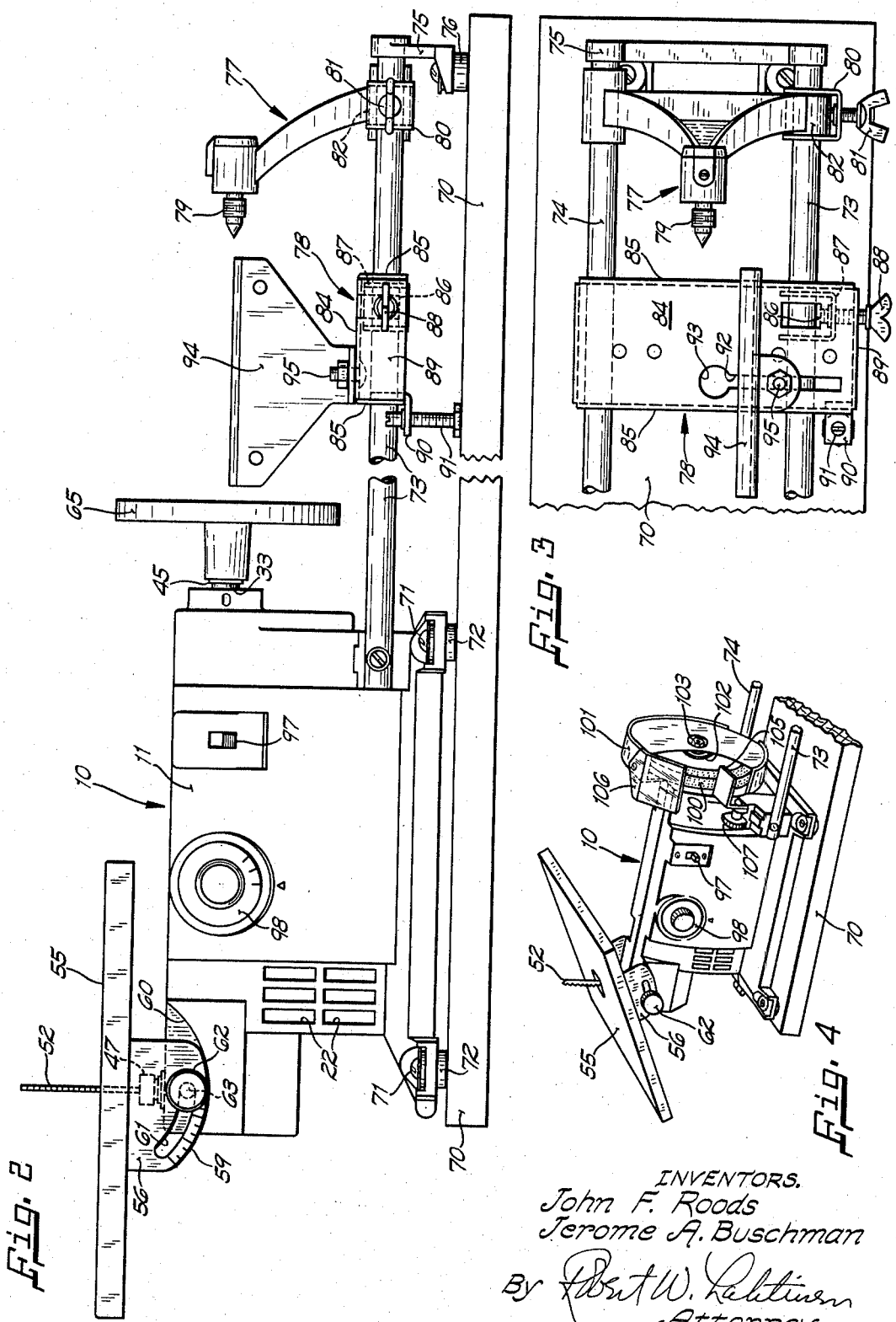

United States Patent Office 3,484,917
Patented Dec. 23, 1969

3,484,917
COMBINATION POWER TOOL
John F. Roods and Jerome A. Buschman, Jefferson City, Mo., assignors to McGraw-Edison Company, Milwaukee, Wis., a corporation of Delaware
Filed May 9, 1967, Ser. No. 637,284
Int. Cl. B23b *11/00;* B27c *9/02*
U.S. Cl. 29—27                                       1 Claim

ABSTRACT OF THE DISCLOSURE

A multiple purpose power tool having a power unit that drives both a reciprocating saw and a rotary element. The rotary element may be utilized as the live head of a lathe or carry a grinder, sander, buffer or similar tool element.

---

This invention relates to power tools and more particularly to a multiple purpose tool that can be utilized for various functions such as sawing, turning, sanding and grinding.

The combination power tool of the present invention is a precision machine designed to do the work of a number of separate shop tools. The power unit has multiple speeds enabling a reciprocating saw driven thereby to rip, to make scroll work and bevel cuts in soft or hard woods, plastics and soft metals such as aluminum, copper or brass through the selection of the proper blade and speed. A rotating element can carry a face plate for use as a lathe with the ways, tailstock and tool support carriage provided or may be replaced by a grinding wheel, buffing wheel, wire wheel or drum sander.

It is an object of this invention to provide an improved multiple purpose power tool which is simple in operation, economical to manufacture and readily changed from one desired function to another.

It is a further object of this invention to provide an improved combination shop tool with an improved tool support carriage.

These and other objects and advantages of this invention will become apparent from the following description when taken in connection with the accompanying drawings, wherein:

FIG. 2 is a side elevation of the tool of this invention with the lathe ways and base member interrupted;

FIG. 3 is a plan view of an end portion of the tool including the tailstock and carriage; and FIG. 4 is a perspective view of the power unit with the saw table mounted at an angle and a grinding wheel and guard replacing the face plate.

Figure 1:
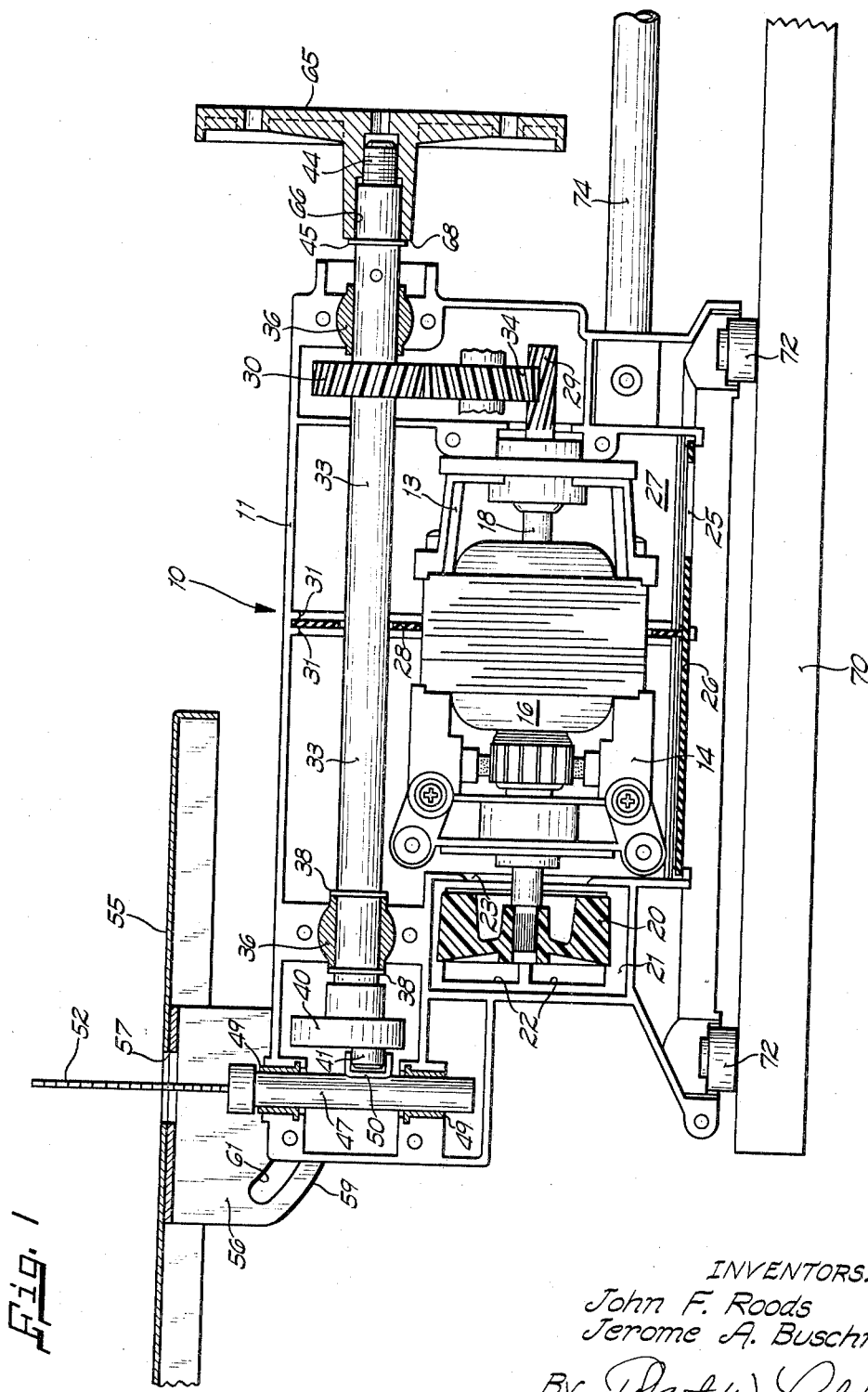
FIG. 1 is a side elevation of the power unit partially in section and partially broken away with one housing half removed.

Referring to the drawings the power unit 10, illustrated in FIG. 1, includes a longitudinally split die cast housing one half 11 of which is shown. A front motor bracket assembly 13 and a brush end motor bracket assembly 14 are secured to the housing half 11 and cooperate to support the motor stator assembly 16 and further carry the bearing members which support the rotor shaft 18. At one axial end of the rotor shaft 18 an impeller 20 is mounted for rotation in unison therewith and disposed within a fan compartment 21 which has openings 22 in the housing adjacent the periphery of the impeller and a suction opening 23 surrounding the shaft, whereby air is drawn into the housing through openings 25 in the bottom cover 26 through the housing motor compartment 27, into the fan compartment 21 and expelled through the housing openings 22 to induce a flow of cooling air past the motor.

An air baffle 28 is confined between the inwardly extending flanges 31 and closely surrounds the shaft 33 and the stator lamination assembly to induce the longitudinal air flow through the housing to pass through the motor. The opposite rotor shaft end 29 has helical gear threads formed thereon and drives a gear 30, pressed on the shaft 33 for rotary motion in unison therewith, through an idler gear 34. The driven shaft 33 is journaled within a pair of bearings 36 carried by the housing and is confined against axial movement by a pair of retaining rings 38 positioned in grooves in the shaft. At one end of the driven shaft 33 a flywheel 40 is pressed on the knurled distal end and carries an eccentrically mounted projecting roller 41. The opposite end of shaft 33 projects beyond the housing with a reduced diameter threaded terminal end portion 44 and an annular groove intermediate the distal end portion and the housing in which is received a spring retaining ring 45.

A ram assembly 47 is journaled within upper and lower ram bearings 49 carrier by the housing for vertical reciprocating movement and includes a generally U-shaped channel member 50 that extends transversely of the housing. The upper portion of the ram receives and releaseably retains a saw blade 52. The flywheel roller 41 is disposed within the transverse channel member 50 to form a scotch yoke which reciprocates the ram assembly 47 as the roller 41 is rotated about the axis of the driven shaft 33. A saw table 55 is mounted on the housing and is pivotable with respect thereto.

A generally U-shaped support member 56 is welded to the saw table with an aperture 57 through the U-shaped member bight portion and the saw table 55 disposed to be received about the upwardly extending saw element 52. The U-shaped member 56 has downwardly depending flange portions that have lower arcuate edge surfaces 59 that cooperate with an arcuate surface 60, that partially define the recess at each transverse side of the housing exterior wall (as seen in FIG. 2), to permit saw table 55 to be positioned in a horizontal position or any of a series of inclined positions. The saw table is secured to the housing by a shoulder bolt 63 at each transverse side which extends through the arcuate slot 61 in the intermediate U-shaped member flange and is received in a threaded bore formed in the housing. This bolt has a knob 62 formed as an integral part thereof which may be manually manipulated to bring the bolt into engagement with and bind the flange of support 56 against the housing.

A face plate 65 is mounted on the threaded end 44 of shaft 33 with a cylindrical bore 66 slidably received over the unthreaded shaft end portion and a threaded bore which threadably receives the reduced cross-section threaded end portion to bring the axial end surface 68 of the face plate 65 into abutting relation with the retainer ring 45.

As seen in FIG. 2 the drive unit is mounted on a base member 70 by a series of screws 71 which pass through apertures in the housing portions and through resilient feet 72 to engage the base member. A pair of lathe ways 73, 74 are each bolted at one end to the housing and received at the opposite end in a rear brace member 75 which is supported on resilient feet 76 and secured to the base member 70. The lathe ways 73, 74 are formed of tubular steel members about which are supported a tailstock assembly 77 and a carriage assembly 78. The tailstock assembly 77 includes a center 79 coaxial with driven shaft 33 and releaseably secured by a set screw to the balance of the tailstock assembly. The tailstock portion 82 which surrounds the way 73 is adjoined at either axial side by the flanges of a locking bracket 80 that has a threaded aperture in the web portion through which is received a thumb screw 81. The thumb screw 81 is manually advanced to engage the tailstock portion 82 and secure the tailstock in a predetermined position along the lathe ways 73, 74.

The carriage assembly 78 includes the carriage 84 which is formed of sheet material with the four marginal portions side flanged downwardly to form the vertical sides of the carriage. The lathe ways 73, 74 are journaled through apertures in the carriage side wall portions 85 to enable the carriage to be moved along way 73, 74. A depending tab 86 pierced from the deck of the carriage extends downwardly immediately adjacent the lathe way 73. A generally U-shaped locking bracket 87 with apertures in the flange portions surrounds the ways at either side of the depending tab 86. A thumb screw 88, which extends through a bore in the carriage wall 89, is threadably received in a threaded aperture in the locking bracket web portion and is engageable with the downwardly depending tab 86 to selectively engage the tab 86 and force it to bear against the lathe way 73 to secure the carriage in a fixed position with respect to the way. An angle member 90 is welded to the carriage 84 and projects horizontally from the lower portion of the carriage. A carriage support bolt 91 is received in a threaded aperture of the bracket and may be advanced to engage the upper surface of the base member 70 to provide support for carriage assembly 78. An elongated slot 92 is formed in the top portion wall of carriage 84 with an enlarged opening 93 at the inward end.

A tool rest 94 is mounted on the carriage 84 and secured thereto by a bolt 95 which has a head portion that will pass through the enlarged opening 93 at the end of the slot and has a square shank portion adjacent the head with a dimension to allow it to be received in the slot 92 between the parallel side walls thereof to prevent rotation of the bolt and thus permit the tool support to be secured to, removed from or adjusted with respect to the carriage 84 without access to the head portion of bolt 95 underlying the carriage top wall.

As seen in FIG. 2 an on-off slide switch 97 is mounted on the housing half to selectively interrupt the power supply to the power unit 10 and a three-position rotary switch 98 is provided for varying the speed of the motor.

The tool may also be used as a disk sander by adhering a sanding disk to the face plate 65, or the face plate 65 may be removed and any of a number of other rotating accessories substituted therefor such as a grinding wheel, a drum sander, a circular wire brush, or a buffing wheel. FIG. 4 shows the power unit with the saw table 55 disposed at an angle and face plate 65 replaced with a grinding wheel 100 for use as a bench grinder. A grinding wheel guard 101 has an annular collar which projects within and is secured concentrically within the housing collar which surrounds the driven shaft. Grinding wheel 100 is flanked by two flat washers 102 and is secured concentrically about the driven shaft 33 between the spring washer 45 (seen in FIG. 1) and a nut 103 threadably received about the threaded end 44 of the driven shaft. The grinder guard also carries a tool rest 105 secured thereto by a knob 107 and an eye-shield 106.

Although but one embodiment has been shown and described it will be apparent that various changes and modifications may be made therein without departing from the spirit of the invention or from the scope of the appended claims.

What is claimed is:

1. A multiple purpose combination power tool, comprising a base member, a housing mounted to one end of the base member and a rear brace mounted to the opposite end of the base member, a shaft rotatably journaled within the housing and projected from the housing toward the rear brace and having a workholding means on the projecting portion thereof, drive means within the housing rotating the shaft, a pair of lathe ways each supported between the housing and the rear brace parallel to one another and spaced from the base member, a tail stock adjustably mounted on the lathe ways, a carriage assembly adjustably mounted on said lathe ways between the tail stock and housing and including an upright tool rest, a foot carried by the carriage assembly and adjustable to abut against the base member for restricting lateral movement of the carriage assembly relative to the housing and rear brace, a ram journalled for reciprocation within the housing and having one end projecting from the housing, means within the housing connected to said drive means for reciprocating said ram, a table adjustably pivoted to the housing in overlying relationship to said ram, and means at said one end of said ram for releasably keying thereto a reciprocating tool element disposed to extend through an opening in said table.

References Cited
UNITED STATES PATENTS

| 2,619,135 | 11/1952 | Callaway | 144—1 |
| 212,326 | 2/1879 | Selden | 144—48 |
| 271,014 | 4/1883 | Austin | 144—1 |

FRANCIS S. HUSAR, Primary Examiner

U.S. Cl. X.R.

144—48